United States Patent Office 3,073,064
Patented Jan. 15, 1963

3,073,064
METHOD FOR IMPROVING PHYSICAL PROPERTIES OF CLAYS AND CLAY-CONTAINING SOILS AND COMPOSITIONS RESULTING THEREFROM, INCLUDING QUATERNARY AMMONIUM COMPOUNDS
John B. Hemwall, Long Beach, Calif., assignor to The Dow Chemical Company, Midland, Mich., a corporation of Delaware
No Drawing. Filed May 29, 1961, Ser. No. 113,116
18 Claims. (Cl. 47—58)

This invention concerns compositions and methods for the treatment of clays and clay-containing soils having at least 5 weight percent clay, dry basis, with a quaternary ammonium compound (hereafter QA) having the formula:

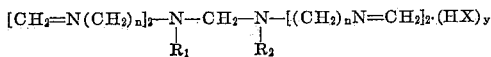

in which $R_1$ and $R_2$ individually are one of H and 1 to 16 carbon alkyl and alkaryl groups; $n$ is an integer from 2 to 3; $y$ is an integer from 1 to 2; and X is one of Cl and Br. The invention particularly concerns treating clays and clayey soils for the controlled fracturing of crust-forming soils in agriculture.

Clays and clay-containing soils are widespread, occurring naturally in various geological deposits. They have the properties of being dimensionally unstable and of forming fluid cohesive and adhesive mixtures in the presence of water. Conversely, upon drying, they become extremely stress resistant. While many of the uses of clays and clayey soils depend upon these properties, they are a distinct handicap in agriculture. Thus, clay-containing soils which have been exposed to rain or irrigation water and subsequently dried often will form crusts through which plant penetration is very difficult or impossible.

For agricultural purposes, it is impossible to avoid the use of a clay-containing soil where it exists, except to retire it from agricultural production. Frequently, however, the crusting problem with such soils is mitigated by the use of crops which are more capable of penetrating through crusts, or by planting several seeds together so that by their combined effort at least one plant will emerge, or by transplanting seedlings, in which case the plant does not need to penetrate the crusted soil surface. In many cases these are quite satisfactory solutions to the crusting problem. In other cases, however, these techniques impose restrictions on the grower that he would prefer to avoid. The other alternative used, of course, is to proceed in the hope that conditions necessary to crust formation do not occur before the plants have penetrated the soil surface. While this is frequently the case, there are numerous times when it is not, and severe losses to the farmer result. Thus, there is a definite need for clays and clayey soils, which, after natural or artificial watering and then drying, have the property of less stress resistance than such soils or materials when untreated. Such treated clayey soils can be considered to be less water sensitive than the corresponding untreated soils.

This invention is particularly concerned with the treatment of clays and clay-containing soils having at least 5 weight percent, dry basis, of a naturally occurring clay, e.g., of the kaolinitic, montmorillonitic, illitic or mixed layer type, with a QA compound, as specified above, in an amount ranging between about 0.0025 and 2 weight percent, dry clay basis, to improve their physical properties for agricultural purposes.

By way of illustration, the following sorts of QA compounds can be used in the practice of this invention:

Methylenebis(dodecylbis(2-(methyleneamino)ethyl) ammonium bromide)
(Bis(2 - methyleneamino)ethyl)aminomethyl)hexadecylbis(2-methyleneamino)ethyl ammonium bromide)
Methylenebis(hexadecylbis(2 - (methyleneamino)ethyl) ammonium bromide)
(Bis(3 - methyleneamino)propyl)aminomethyl - hexadecylbis(3-methylamino)-propyl)ammonium bromide
(Bis(3 - methyleneamino)propyl)aminomethyl)hexadecylbis(3-(methyleneamino)-propyl)ammonium bromide
Methylenebis(ethylbis(2 - (methyleneamino)ethyl) ammonium bromide)
Methylenebis(butylbis(2 - (methyleneamino)ethyl) ammonium bromide)
Methylenebis(bis(3 - (methyleneamino)propyl)octyl ammonium bromide)
(Bis(3 - (methyleneamino)propyl)aminomethyl)dodecylbis(3-methyleneamino)propyl) ammonium bromide)
Benzyl(bis(3 - methyleneamino)propyl)aminomethyl)bis (3-(methyleneamino)propyl) ammonium chloride
Methylenebis(benzylbis(3 - (methyleneamino)propyl) ammonium chloride)
(Bis(2 - (methyleneamino)ethyl)aminomethyl)ethylbis (2-(methyleneamino)ethyl) ammonium bromide)
(Bis(3 - (methyleneamino)propyl)aminomethyl)ethylbis (3-(methyleneaminopropyl) ammonium bromide)
Methylenebis(ethylbis(3 - (methyleneamino)-propyl) ammonium bromide
(Bis(2 - (methyleneamino)ethyl)aminomethyl)butylbis 2 - (methyleneamino)ethyl ammonium bromide)
(Bis(3 - (methyleneamino)propyl)aminomethyl)butylbis (3-(methyleneamino)propyl) ammonium bromide)
Methylenebis(butylbis(3 - (methyleneamino)propyl) ammonium bromide)
Bis(3 - (methyleneamino)propyl)aminomethyl)bis(3 - (methyleneamino)propyl)octyl ammonium bromide)

They may be prepared by the method disclosed in U.S. Patent 2,960,535, patented November 15, 1960.

The QA compounds can be applied to the clay or clay-containing soil in several ways. The preferred way involves dispersing the QA compound either as a suspension or as a solution in a liquid medium and admixing the resulting liquid dispersion with the clay or clay-containing soil via spraying, slurrying or other suitable methods. Suitable liquids for dispersion have a boiling point up to ca. 150° C. and include water, ketones, alcohols and hydrocarbon solvents, mixtures thereof and emulsions thereof, either oil-in-water or water-in-oil.

Because of the diverse nature of the QA compounds utilized in the practice of this invention, some types of compounds are soluble, dispersible or emulsifiable in relatively hydrophilic media, others in relatively hydrophobic media. Upon inspection of a chemical formula, the art skilled can generally determine a solvent, dispersion medium or emulsifier satisfactory for a given QA compound. In any event, the operability and desirability of a given solvent, dispersion medium or emulsifying agent can be determined by a simple test wherein a given QA compound is dissolved, suspended or its solution emulsified in a given medium. Obviously, solvents, diluents and emulsifying agents are used which are inert toward the QA compound. Hereinafter, such solutions, suspensions and emulsions will sometimes be referred to broadly as dispersions and the solvent, suspension and emulsion media will be referred to broadly as dispersion media. Advantageously, the QA compound dispersion contains between 0.0025 and 50 weight percent of QA compound. The treatment of the clay or clay-containing soil with the QA compound should result in the clay or clay-containing soil containing at least 0.0025% and advantageously up to 2% by weight of the QA compound, dry clay basis. The upper limit is essentially economic. The QA compounds used for agricultural purposes need be applied only to the actual volume of soil treated. Thus, when a QA compound is used to decrease soil crusting, it is practical to treat only the soil immediately above the seed row. Depending upon how carefully the QA compound is applied to this restricted volume of soil, anywhere from 0.1 pound to 10 pounds of the QA compound is sufficient to treat one acre of crop land.

The modulus of rupture (MR) is a test to determine the maximum stress that a material will withstand without breaking and is determined by subjecting a rectangular briquette to a bending moment. This test is commonly accepted by soil scientists as a measure of the crusting potential of a soil and, hence, its relative suitability as an agricultural soil. The lower the maximum stress before rupture, the less the crusting potential of the soil.

The MR was determined herein on an apparatus patterned after that as described and used by L. A. Richards in the Soil Science Society of America Proceedings, 17:321–323.

In each set of determinations conducted to provide the data for the following examples, one control was included. The control was prepared in a manner exactly analogously to the other treatments except that no QA compound was used.

The following examples describe completely specific embodiments and the best mode contemplated by the inventor for carrying out his invention. They are not to be construed as limiting the invention, which is defined in the claims.

EXAMPLE 1

A series of samples of finely ground, air-dried, slightly acid, clay loam soil was brought up to a moisture content of about 17% by spraying water as a fine mist onto the soil samples while subjecting them to thorough mixing. Various QA compounds, as indicated in following Table I, were immediately added in series to the soil samples by spraying with and mixing in 5 to 10 ml. of an acetone solution containing 20 mg. of the QA compound per 100 g. of air-dried soil to provide a treated soil containing 200 p.p.m. of QA compound on a dry soil weight basis.

Once the soil had been treated, it was allowed to stand in the open air for at least two hours and then was dried in an oven at 30° C. overnight. The heated soil was then divided into replicates of 25 to 30 g. each and placed into two rectangular molds 3.2 cm. wide by 6.4 cm. long. The soil in the molds was then leveled and compacted with a special compacting tool. The compacting tool has a base which covers the leveled soil sample and onto which was dropped a weight of 31.5 g. from a height of 31.5 cm. This weight was dropped repeatedly for six times, after which the soil was flooded with water. After the excess water had drained through the soil, the samples were dried overnight in an oven at 30° C. The resulting briquettes were then tested by the method cited above for their MR.

*Table I*

| QA Compound | MR in millibars |
|---|---|
| Control | 6,200 |
| Methylenebis(dodecylbis(2-(methyleneamino)ethyl) ammonium bromide) | 2,400 |
| (Bis(2-methyleneamino)ethyl)aminomethyl)hexadecylbis(2-(methyleneamino)ethyl ammonium bromide) | 3,200 |
| Methylenebis(hexadecylbis(2-(methyleneamino)ethyl) ammonium bromide) | 1,500 |
| (Bis(3-methyleneamino)propyl)aminomethyl)hexadecylbis(3-(methylamino)-propyl) ammonium bromide | 1,900 |
| (Bis(3-(methyleneamino)propyl)aminomethyl)hexadecylbis(3-(methyleneamino)-propyl) ammonium bromide) | 2,200 |

EXAMPLE 2

The procedure of Example 1 was repeated with another similar soil sample and with other QA compounds with the following results:

*Table II*

| QA Compound | MR in millibars |
|---|---|
| Control | 4,300 |
| Methylenebis(ethylbis(2-(methyleneamino)ethyl) ammonium bromide) | 2,650 |
| Methylenebis(butylbis(2-(methyleneamino)ethyl) ammonium bromide) | 1,900 |
| Methylenebis(bis(3-(methyleneamino)propyl)octyl ammonium bromide) | 2,200 |
| (Bis(3-(methyleneamino)propyl)aminomethyl)dodecylbis(3-(methyleneamino)propyl) ammonium bromide) | 1,400 |
| Benzyl(bis(3-methyleneamino)propyl)aminomethyl)bis(3-(methyleneamino)propyl) ammonium chloride | 1,900 |
| Methylenebis(benzylbis(3-(methyleneamino)propyl) ammonium chloride) | 2,100 |

EXAMPLE 3

The procedure of Example 1 was repeated with another similar soil sample and with other QA compounds with the following results:

*Table III*

| QA Compound | MR in millibars |
|---|---|
| Control | 6,400 |
| (Bis(2-(methyleneamino)ethyl)aminomethyl)ethyl-bis(2-(methyleneamino)ethyl) ammonium bromide) | 4,700 |
| (Bis(3-(methyleneamino)propyl)aminomethyl)ethyl-bis(3-(methyleneaminopropyl) ammonium bromide) | 3,600 |
| Methylenebis(ethylbis(3-(methyleneamino)-propyl) ammonium bromide | 3,800 |
| (Bis(2-(methyleneamino)ethyl)aminomethyl)butyl-bis(2-(methyleneamino)ethyl ammonium bromide) | 5,000 |
| (Bis(3-(methyleneamino)propyl)aminomethyl)butyl-bis(3-(methyleneamino)propyl) ammonium bromide) | 4,000 |
| Methylenebis(butylbis(3-(methyleneamino)propyl) ammonium bromide) | 4,100 |
| Bis(3-(methyleneamino)propyl)aminomethyl)bis(3-(methyleneamino)propyl)octyl ammonium bromide) | 4,500 |

What is claimed is:

1. The method of treatment of clays and clay-containing soils containing at least 5 weight percent clay, soil basis, by admixing therewith a compound having the formula:

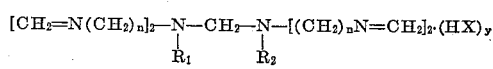

in which $R_1$ and $R_2$ individually are one of H and 1 to 16 carbon alkyl and alkaryl groups; $n$ is an integer from 2 to 3; $y$ is an integer from 1 to 2; and X is one of Cl and Br, in amount sufficient to provide at least 0.0025 weight percent of said compound, dry clay basis.

2. A composition of a clay material of the group consisting of clays and clay-containing soils containing in admixture therewith at least 0.0025 weight percent, clay basis, of a compound having the formula:

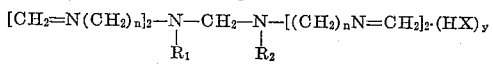

in which $R_1$ and $R_2$ individually are one of H and 1 to 16 carbon alkyl and alkaryl groups; $n$ is an integer from 2 to 3; $y$ is an integer from 1 to 2; and X is one of Cl and Br.

3. The composition of claim 2 wherein the clay-containing material contains at least 5 weight percent clay, dry basis.

4. The composition of claim 2 wherein the compound is methylenebis(dodecylbis(2 - (methyleneamino)ethyl) ammonium bromide).

5. The composition of claim 2 wherein the compound is methylenebis(hexadecylbis(2-(methyleneamino)ethyl) ammonium bromide).

6. The composition of claim 2 wherein the compound is (bis(3-methyleneamino)propyl)aminomethyl)hexadecylbis(3 - (methylamino)propyl) ammonium bromide.

7. The composition of claim 2 wherein the compound is (bis(3 - (methyleneamino)propyl)aminomethyl)hexadecylbis(3-(methyleneamino)-propyl) ammonium bromide).

8. The composition of claim 2 wherein the compound is methylenebis(butylbis(2-(methyleneamino)ethyl) ammonium bromide).

9. The composition of claim 2 wherein the compound is methylenebis(bis(3 - (methyleneamino)propyl) octyl ammonium bromide).

10. The composition of claim 2 wherein the compound is (bis(3 - (methyleneamino)propyl)aminomethyl)dodecylbis(3-methyleneamino)propyl) ammonium bromide).

11. The composition of claim 2 wherein the compound is benzyl(bis(3 - methyleneamino)propyl)aminomethyl)-bis(3-(methyleneamino)propyl) ammonium chloride.

12. The composition of claim 2 wherein the compound is methylenebis(benzylbis(3 - (methyleneamino)propyl) ammonium chloride).

13. The composition of claim 2 wherein the compound is (bis(2-(methyleneamino)ethyl)aminomethyl)ethylbis-(2-(methyleneamino)ethyl) ammonium bromide).

14. The composition of claim 2 wherein the compound is (bis(3 - (methyleneamino)propyl)aminomethyl)ethylbis(3-(methyleneaminopropyl) amminoum bromide).

15. The composition of claim 2 wherein the compound is methylenebis(ethylbis(3 - (methyleneamino) - propyl) ammonium bromide.

16. The composition of claim 2 wherein the compound is (bis(3 - (methyleneamino)propyl)aminomethyl)butyl-bis(3-(methyleneamino)propyl) ammonium bromide.

17. The composition of claim 2 wherein the compound is methylenebis(butylbis(3 - (methyleneamino)propyl) ammonium bromide).

18. The composition of claim 2 wherein the compound is (bis(3 - (methyleneamino)propyl)aminomethyl)bis(3-(methyleneamino)propyl)octyl ammonium bromide).

References Cited in the file of this patent

UNITED STATES PATENTS

| | | |
|---|---|---|
| 2,807,910 | Erickson | Oct. 1, 1957 |
| 2,979,863 | Bauwin | Apr. 18, 1961 |